Jan. 4, 1938.  A. M. BABITCH ET AL  2,104,448
FUEL PUMP
Filed April 24, 1936   2 Sheets-Sheet 1
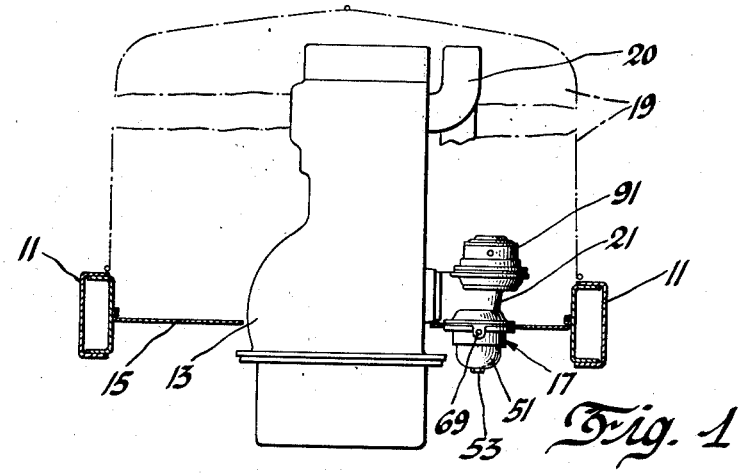
Fig. 1
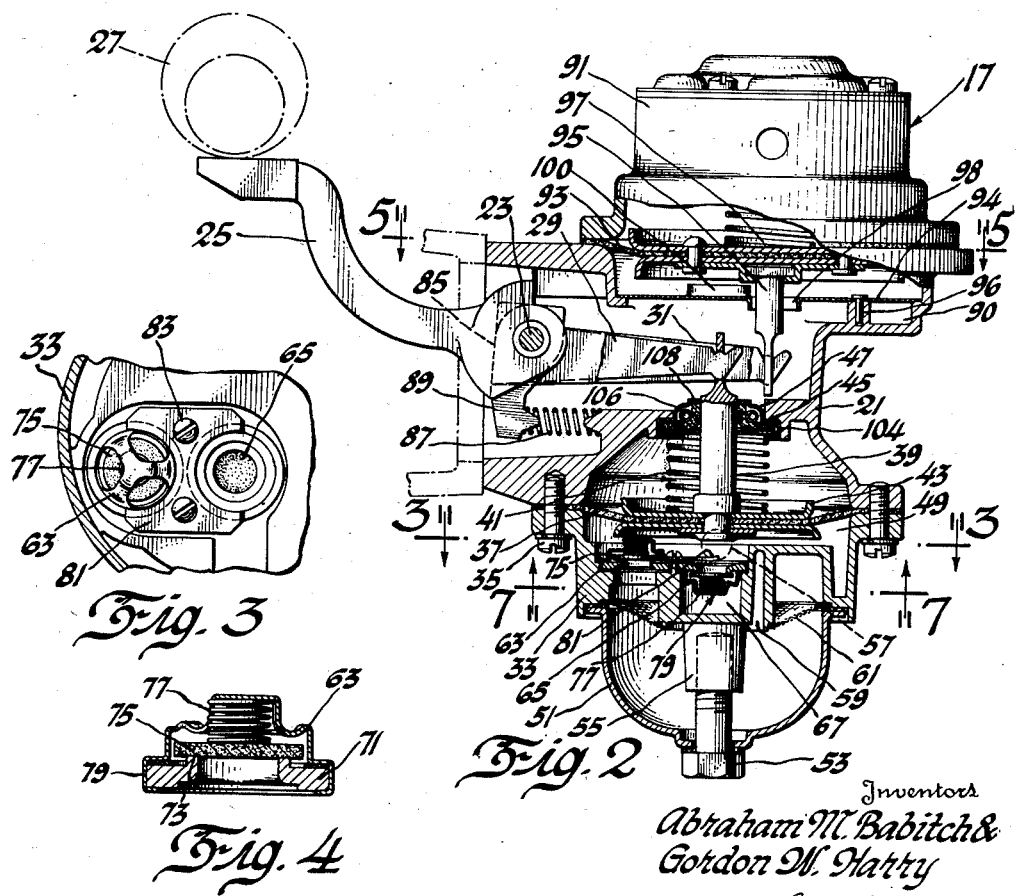
Fig. 2
Fig. 3
Fig. 4
Inventors
Abraham M. Babitch &
Gordon W. Harty
By Blackmore, Spencer & Flint
Attorneys

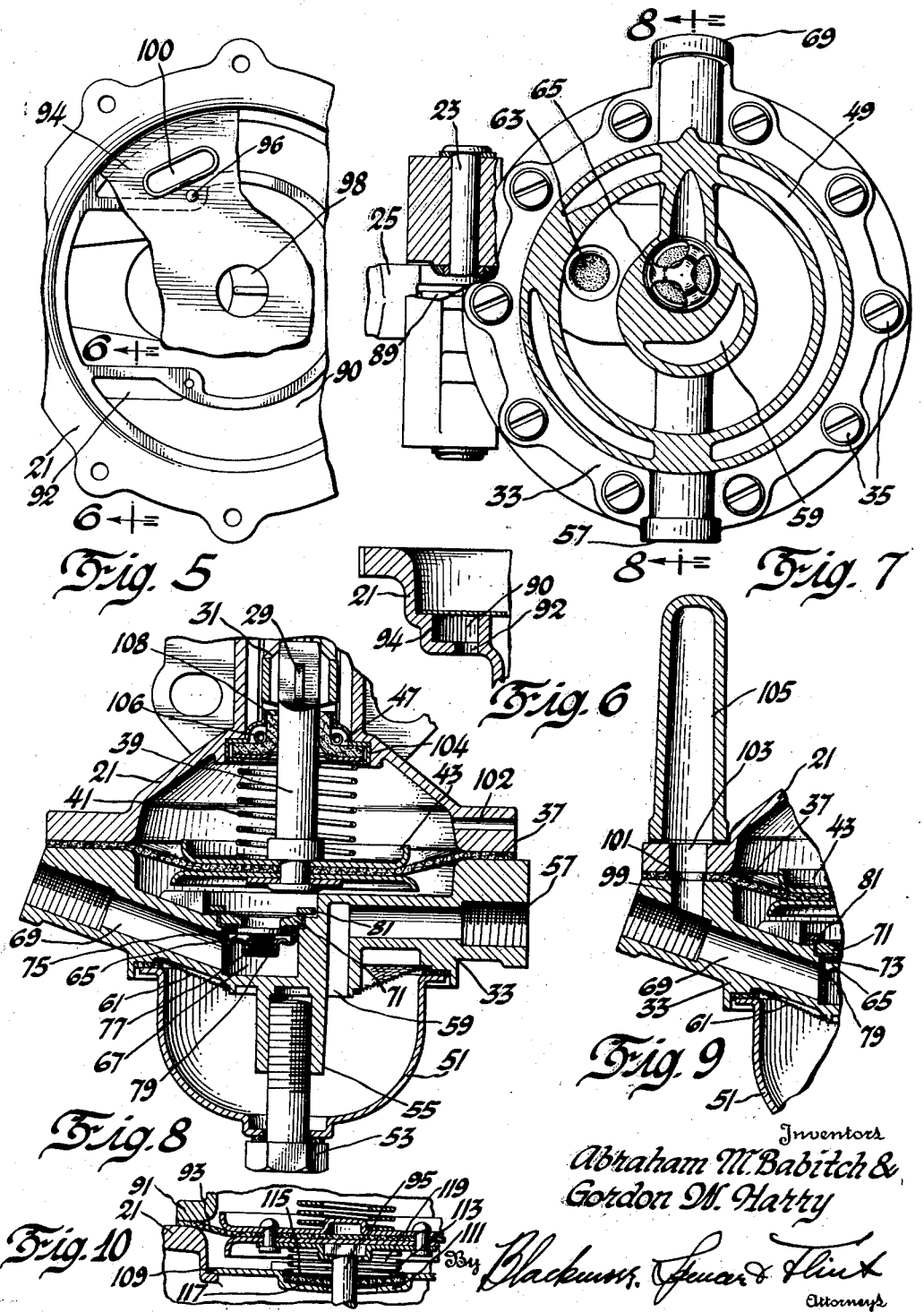

Patented Jan. 4, 1938

2,104,448

UNITED STATES PATENT OFFICE 2,104,448

FUEL PUMP

Abraham M. Babitch and Gordon W. Harry, Flint, Mich., assignors to General Motors Corporation, Detroit, Mich., a corporation of Delaware Application April 24, 1936, Serial No. 76,110

1 Claim. (Cl. 123—139)

This invention relates to the fuel supply system for the engine of a motor vehicle.

An object of the invention is to provide an improved system in which the liquid fuel is less likely to be vaporized.

Another object is the accomplishment of the major object with no increase in cost over known fuel systems.

As still another object the inventive idea is incorporated in a specific form wherein the fuel system includes as a part thereof an engine-operated fuel pump with which is associated an air pump, as in prior designs, and wherein the major object is accomplished by what may be termed an inexpensive inverted arrangement of the pumps.

Still another object and one concerned with the structural arrangement is the location of the fuel pump relative to the conventional splash pan where it will be subject to the influence of the prevailing air temperature rather than to the hot air in the region adjacent the engine, the air confined between the engine, the hood, and the pan.

Other objects and advantages will be understood from the following description.

In the drawings accompanying the description, Fig. 1 is a view in side elevation showing diagrammatically the relation of parts involved in the departure from analogous systems.

Fig. 2 is a vertical section through the pump part of the system.

Fig. 3 is a plan view showing the valve assembly as seen from line 3—3 of Fig. 2.

Fig. 4 is a transverse section through one of the valves.

Fig. 5 is a detail in plan view of a part of the assembly, portions broken away as seen from line 5—5 of Fig. 2.

Fig. 6 is a section on line 6—6 of Fig. 5.

Fig. 7 is a section on line 7—7 of Fig. 2.

Fig. 8 is a section on line 8—8 of Fig. 7.

Fig. 9 is a partial section corresponding to that of Fig. 8 but showing a slightly modified form.

Fig. 10 is a vertical sectional view of a slightly modified form.

Referring to the drawings, numeral 11 is used to designate the frame bars of the chassis of a motor vehicle, the engine of which is marked 13. As is customary, there is a splash pan marked 15. The splash pan showing is diagrammatic and is intended to illustrate only the relative position to itself of the fuel pump 17. It will be understood that this fuel pump is a part of the usual fuel system. The complete system includes the fuel reservoir, a conduit therefrom to the pump, and a conduit between the pump and the engine carburetor. For the purpose of this application the reservoir, conduits, etc. may be considered conventional and are not illustrated.

Fuel pumps of the kind here involved are operated mechanically from the engine cam shaft, thus necessitating a position of the pump near the engine. In consequence, the pump, in being so positioned, is usually confined in the space between parts corresponding to the engine hood 19 and the splash pan 15. Frequently, too, the pump is near the hot exhaust manifold 20.

In more recent motor vehicle designs, the shape and position of the hood and pan and the use of additional sheet metal parts has tended to shield this region from the cooling effects of the air outside this enclosure, and any parts such as the fuel pump within the enclosure are subject to the excessive engine heat. This has increased the tendency to volatilize the liquid fuel and cause vapor lock. In accordance with the present invention the larger part of the fuel pump is projected downward through the pan. In this way the fuel carrying parts of the pump are subject to the surrounding atmosphere temperature, that part only of the pump which is provided with the operating mechanism being above the pan and subjected to the higher temperature.

In some former designs there has been used with the fuel pump an air pump. The two pumps have been spaced vertically and the engine cam operated means has projected into a region between the two pumps. In such constructions the air pump has been located below the fuel pump. In the present invention the association of pumps is continued but their relative position has been reversed so that the fuel-carrying parts may be sufficiently low to be projected below the splash pan.

The novel arrangement is the occasion of some structural changes to keep engine oil from the fuel pump and to improve the arrangement for air venting of the region beneath the reciprocating member of the air pump.

The combined pump of the present application comprises an intermediate die casting 21 adapted to be secured to the engine and having a pivotal support at 23 for a lever 25. When the pump part 21 is in position, the lever 25 is engaged with and rocked by an engine cam 27. Also pivoted concentrically with the lever are links 29 and 31. A second die cast element 33 is clamped to casing 21 by fastening means 35, there being a diaphragm 37 therebetween. The diaphragm is moved in one direction by a stem 39 secured thereto and engaged with the end of link 29 itself actuated by lever 25, and moved in the opposite direction by a spring 41 seated against a diaphragm cup 43 and an abutment 45 carried by a sealing device 47 the latter serving to prevent the entrance of engine oil to the region adjacent the diaphragm. The sealing device comprises a casing 104 press-fitted into a counterbore of member 21 around stem 39, being held in place by staking the wall of the counterbore. The casing houses a spring 106 which presses an upwardly directed flange of a washer 108 firmly against the stem 39.

The die cast member 33 is formed with a recess 49 beneath the diaphragm to constitute a pump chamber. To the underside of the casting 33 is secured a filter and drain cup 51 by fastening means 53, its head engaging around an opening at the bottom of the cup and its shank threaded into the lower end of a boss 55 integral with the casting. The casting has an inlet passage 57 communicating with an arcuate region 59 closed at the top but opening into the cup beneath a strainer 61 fastened as shown between the boss and the outer wall of the casting. The fuel, after being freed from sediment and water by the strainer, passes up through the inlet valve 63 into the pump chamber. From the pump chamber the fuel passes through an outlet valve 65 into a space 67, thence out through a passage 69. The two valves are of identical construction. Each comprises a ring 71 forming a seat 73, a valve disc 75, a spring 77, and a retainer 79 in the form of a stamping surrounding the larger diameter part of the ring 71 and carried up to form an abutment for the spring. The valves are located in closely adjacent relation, the outer face of one and a mid portion face of the other contacting coplanar depressed shoulders on the casting 33. A clip 81 engages the other faces of the valve rings and is fastened by screws 83 to the casting.

In the operation of the pump the lever 25 is rocked counterclockwise by the cam. The lever 25 has a face 85 adapted to engage the link 29 and raise the diaphragm to make a suction stroke. The spring 41 functions to make the discharge stroke. During the discharge stroke the cam is in the idle phase of its movement and a spring 87 in abutment with the casing 33 pushes a stamping 89 against the lever and holds the latter against the cam. The contact at 85 provides the lost motion usual in such pumps and necessary to provide the variable stroke.

Above the intermediate part 21 is another die cast housing 91. This housing constitutes an air pump and employs a diaphragm 93 having a stem 95 connected to the link 31 operated by the lever 25 for one direction of movement. A spring 97 moves the diaphragm in the opposite direction. This air pump may be used as a booster for the motor of a windshield wiper as in similar combined pumps now in use. For the purpose of venting the space beneath diaphragm 93, the upper part of casting 21 is formed with a substantially circular channel 90. An air vent 92 is formed in the wall of part 21 to permit air to flow between channel 90 and the outer air. The vent 92 is substantially at one end of the circular channel. A cover 94 is fastened over the channel and to part 21 by pins 96 press-fitted therein. The cover has an opening 98 for the passage of stem 95 and another opening 100 affording communication between the space above the cover and the end of the circular channel opposite air vent 92. Walls about openings 98 and 100 are formed as shown to prevent oil splashing into the channel. The long circular channel 90 is utilized to effect maximum silencing. Another opening 102 is provided for venting the air space above the fuel pump diaphragm. Also, by means of this opening, gasoline may escape and not enter the crank case in the event of breakage of the diaphragm of the fuel pump. In other respects the air pump may be regarded as conventional.

As stated above, in prior constructions the fuel pump has been positioned above the equivalent of casing 21 and the air pump below. Since it is desired to cool the fuel pump, the relative position has been reversed and the fuel pump has been projected through an opening in the splash pan as clearly shown by Fig. 1. In this way the fuel pump parts carrying the volatile liquid are removed from the relative hot region near the engine and are subject to the cooler outer air.

In Fig. 9 the outlet passage is formed as in Fig. 6. In addition thereto is an intersecting passage 99, a registering hole 101 in the diaphragm, a registering passage 103 in casting 21, and over passage 103 is placed a hollow air dome 105 functioning to cause a more uniform discharge of fuel.

To prevent oil vapors from the crank case from reaching and damaging the diaphragm of the vacuum pump and then escaping to the atmosphere, we may seal the space corresponding to 98 in Fig. 2. Such a sealing expedient is shown in Fig. 10. In this figure parts 91, 21, 93, 95 are like the corresponding parts in Fig. 2. In place of cover 94 we use a cover 109 with a centrally depressed region 111 having a large opening for the passage of stem 95. A leather washer 113 with upper and lower retainers 115 and 117 rests on cover 109 in the region 111 and a spring 119 between the lower diaphragm plate and the upper retainer 115 holds the sealing assembly in position. The sealing washer closely surrounds stem 95 and serves to keep vapors from the oil from passing up through the opening in cover 109 and from damaging the diaphragm and then escaping to the outer air.

We claim:

In a motor vehicle, an engine, a hood, a splash pan, said parts forming an enclosure, said engine having an exhaust manifold within said enclosure whereby the temperature within the enclosure is higher than the outside air, a pump to supply said engine with fuel, said pump extending through said splash pan and having its upper part within said enclosure, means driven by the engine and located in said upper part to operate said pump, said pump having a fuel chamber in its lower part and positioned below said splash pan whereby the fuel may not be subject to the heat within said enclosure but may be cooled by the flow of air beneath said pan.

ABRAHAM M. BABITCH.
GORDON W. HARRY.